(12) United States Patent
Sakaguchi et al.

(10) Patent No.: US 11,185,939 B2
(45) Date of Patent: Nov. 30, 2021

(54) WIRE ELECTRIC DISCHARGE MACHINING APPARATUS

(71) Applicant: SODICK CO., LTD., Kanagawa (JP)

(72) Inventors: Masashi Sakaguchi, Kanagawa (JP); Tsuyoshi Takeda, Kanagawa (JP); Tsubasa Kuragaya, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 425 days.

(21) Appl. No.: 16/199,243

(22) Filed: Nov. 26, 2018

(65) Prior Publication Data

US 2019/0160567 A1 May 30, 2019

(30) Foreign Application Priority Data

Nov. 28, 2017 (JP) .............................. JP2017-227456

(51) Int. Cl.
*B23H 1/02* (2006.01)
*B23H 7/10* (2006.01)

(52) U.S. Cl.
CPC ................ *B23H 1/02* (2013.01); *B23H 7/10* (2013.01); *B23H 7/102* (2013.01); *B23H 7/108* (2013.01)

(58) Field of Classification Search
CPC . B23H 1/02; B23H 7/10; B23H 7/102; B23H 7/108
USPC ...... 219/69.11, 69.15, 69.1, 68, 69.16, 69.17
See application file for complete search history.

(56) References Cited

U.S. PATENT DOCUMENTS

| 4,999,473 | A | 3/1991 | Gamo et al. |
| 6,291,789 | B1 * | 9/2001 | Ootomo .................... B23H 7/10 |
| | | | 219/69.12 |
| 2014/0305908 | A1 | 10/2014 | Nakajima et al. |
| 2014/0357015 | A1 * | 12/2014 | Seto .......................... C22C 9/00 |
| | | | 438/98 |

(Continued)

FOREIGN PATENT DOCUMENTS

| JP | S6219343 | 4/1987 |
| JP | H01135426 | 5/1989 |

(Continued)

OTHER PUBLICATIONS

"Office Action of Japan Counterpart Application," dated May 9, 2019, with English translation thereof, p. 1-p. 6.

(Continued)

*Primary Examiner* — Phuong T Nguyen
*Assistant Examiner* — Yeong Juen Thong
(74) *Attorney, Agent, or Firm* — JCIPRNET

(57) ABSTRACT

A wire electric discharge machining apparatus includes: a processing tank, a lower-side wire guide assembly, a lower arm, a direction changing pulley, a winding roller, and a conveying device. The conveying device comprises a high-pressure jet flow generator and a suction pipe. The high-pressure jet flow generator is provided between the direction changing pulley and the winding roller on a side of a front end of a lower arm, and spouts a high-pressure jet flow toward a direction of the winding roller so that a wire electrode is guided only by a restraining force of the high-pressure jet flow and sent flying to the direction of the winding roller with the high-pressure jet flow. The suction pipe is provided on an exit side of the winding roller, and sucks and captures a tip of the wire electrode sent by the high-pressure jet flow.

7 Claims, 2 Drawing Sheets

(56) References Cited

U.S. PATENT DOCUMENTS

2016/0074950 A1* 3/2016 Sasaki ................... B23H 7/108
219/69.12

FOREIGN PATENT DOCUMENTS

| JP | H01140924 | 6/1989 |
| JP | H0592322 | 4/1993 |
| JP | 2643621 | 8/1997 |
| JP | 3744968 | 2/2006 |
| JP | 2006224215 | 8/2006 |
| JP | 2014167724 | 10/2014 |
| KR | 20090069369 | 7/2009 |

OTHER PUBLICATIONS

"Office Action of China Counterpart Application," with English translation thereof, dated Jan. 20, 2020, p. 1-p. 12.
"Office Action of Korea Counterpart Application," with English translation thereof, dated Feb. 4, 2020, p. 1-p. 10.

* cited by examiner

WIRE ELECTRIC DISCHARGE MACHINING APPARATUS

CROSS REFERENCE TO RELATED APPLICATIONS

This application claims the priority benefit of Japanese Patent Application No. 2017-227456, filed on Nov. 28, 2017. The entirety of the above-mentioned patent application is hereby incorporated by reference herein and made a part of this specification.

BACKGROUND OF THE DISCLOSURE

Technical Field

The present disclosure relates to a wire electric discharge machining apparatus, which includes a conveying device that sends out a wire electrode to a winding roller during an automatic connection.

Related Art

A general-purpose wire electric discharge machining apparatus is configured so that a wire electrode is pulled out from a wire bobbin and goes around a tension roller, goes through an upper-side wire guide and a lower-side wire guide, and is wound around a winding roller. A surface of the wire electrode is consumed due to an electrical discharge, so that during process, the wire electrode is stretched with a prescribed tensile force between the upper-side wire guide and the lower-side wire guide, and runs at a certain speed so that an unused surface is always positioned in a processing gap.

A wire electric discharge machining apparatus, which includes an automatic wire connection device automatically stretching the wire electrode between the upper-side wire guide and the lower-side wire guide, is known. The automatic wire connection device sends out the wire electrode to the upper-side wire guide by a delivery roller, sequentially inserts the wire electrode into the upper-side wire guide and the lower-side wire guide, leads the wire electrode to an outer side of a processing tank by a conveying device provided on a lower arm, and makes a tip of the wire electrode captured by the winding roller. Methods for conveying the wire electrode of the conveying device mainly include a belt conveyor type and an actuator type.

Patent literature 1 (U.S. Pat. No. 4,999,473) discloses a wire electric discharge machining apparatus which includes a conveying device of a typical belt conveyor type. The conveying device of the belt conveyor type is advantageous to convey a relatively great wire electrode of which a diameter is over 0.2 mm $\phi$, because a pair of endless belts moves the wire electrode by sandwiching the wire electrode. However, the entire device becomes greater because of the belt conveyor. In addition, when a wire electrode of which a diameter is relatively small, especially a wire electrode which is called an extra-fine wire and of which a diameter is less than 0.1 mm $\phi$, is conveyed, a load given to the wire electrode becomes greater, a disconnection, a twinning, and a derailment of the wire electrode are induced, and a success rate of an automatic wire connection is reduced.

Patent literature 2 (Japanese Laid-open No. H01-135426A) or patent literature 3 (Japanese Laid-open No. H05-92322A) discloses a wire electric discharge machining apparatus which includes a conveying device of a typical actuator type. The conveying device of the actuator type fills a guide pipe with a high-pressure water flow and sucks the high-pressure water flow together with a wire electrode, and conveys the wire electrode by guiding the wire electrode and sending out the wire electrode by a delivery roller, so that the conveying device of the actuator type is excellent in conveying a wire electrode with a relatively small diameter. However, to a wire electrode made by materials with high rigidity and easily curled, especially a wire electrode with a great diameter, a restraining force by the high-pressure water flow tends to be insufficient, and the wire electrode is easily caught and buckled in a thin guide pipe, so that the conveying device of the actuator type is not suitable.

LITERATURE OF RELATED ART

[Patent literature 1] U.S. Pat. No. 4,999,473
[Patent literature 2] Japanese Laid-open No. H01-135426A
[Patent literature 3] Japanese Laid-open No. H05-92322A

SUMMARY

Although over the years, it has been attempted to shorten the time necessary for an automatic wire connection, at least a shortening of time of conveying devices of existing methods approximately reaches a limit. In addition, when a belt conveyor method is used, an endless belt is consumed. When an actuator method is used, a guide pipe is worn out and an inner surface of the guide pipe is roughened, or the guide pipe is accumulated with dust containing wire electrode powders and clogged. Therefore, in both the belt conveyor method and the actuator method, the conveying capacity is reduced in a relatively short time. Furthermore, once the wire electrode fails to be conveyed, the wire electrode cannot be simply removed from the conveying device, and labor and time are necessary for a recovery work.

In view of the problems above, the present disclosure provides a wire electric discharge machining apparatus which includes a novel conveying device capable of further shortening a conveying time. Several advantages, which are obtained by the wire electric discharge machining apparatus of the present disclosure, are shown in detail in each case in a specific description of embodiments.

According to the present disclosure, a wire electric discharge machining apparatus is provided which includes: a processing tank, which accommodates a workpiece; a lower-side wire guide assembly which guides a wire electrode; a lower arm, which is provided so that a front end of the lower arm is positioned on an inner side of the processing tank, and the lower arm supports the lower-side wire guide assembly at the front end; a direction changing pulley, which is provided directly below the lower-side wire guide assembly; a winding roller, which is provided on an outer side of the processing tank; and a conveying device, which sends out the wire electrode to the winding roller; and the conveying device includes: a high-pressure jet flow generator, which is provided between the direction changing pulley and the winding roller on a side of the front end of the lower arm, and spouts a high-pressure jet flow toward a direction of the winding roller so that the wire electrode is guided only by a restraining force of the high-pressure jet flow and sent flying to the direction of the winding roller with the high-pressure jet flow; and a suction pipe, which is provided on an exit side of the winding roller, and sucks and captures a tip of the wire electrode sent by the high-pressure jet flow.

According to the present disclosure, the wire electrode flies with the high-pressure jet flow and is moved from the front end to a back end of the lower arm without stopping, so that the conveying time can be considerably shortened. In addition, the conveying device does not have an endless belt or a guide pipe, so that the conveying device is difficult to degrade, and the conveying capacity can be maintained for a long time. Furthermore, even in case that the wire electrode fails to be conveyed, there is no obstacle between a high-pressure jet flow generator and a suction pipe, so that the wire electrode can be simply removed, and the recovery work is easy. As a result, the time necessary for the automatic wire connection can be shortened without decreasing a success rate of the automatic wire connection, and work efficiency is improved.

DESCRIPTION OF THE EMBODIMENTS

Figure 1:
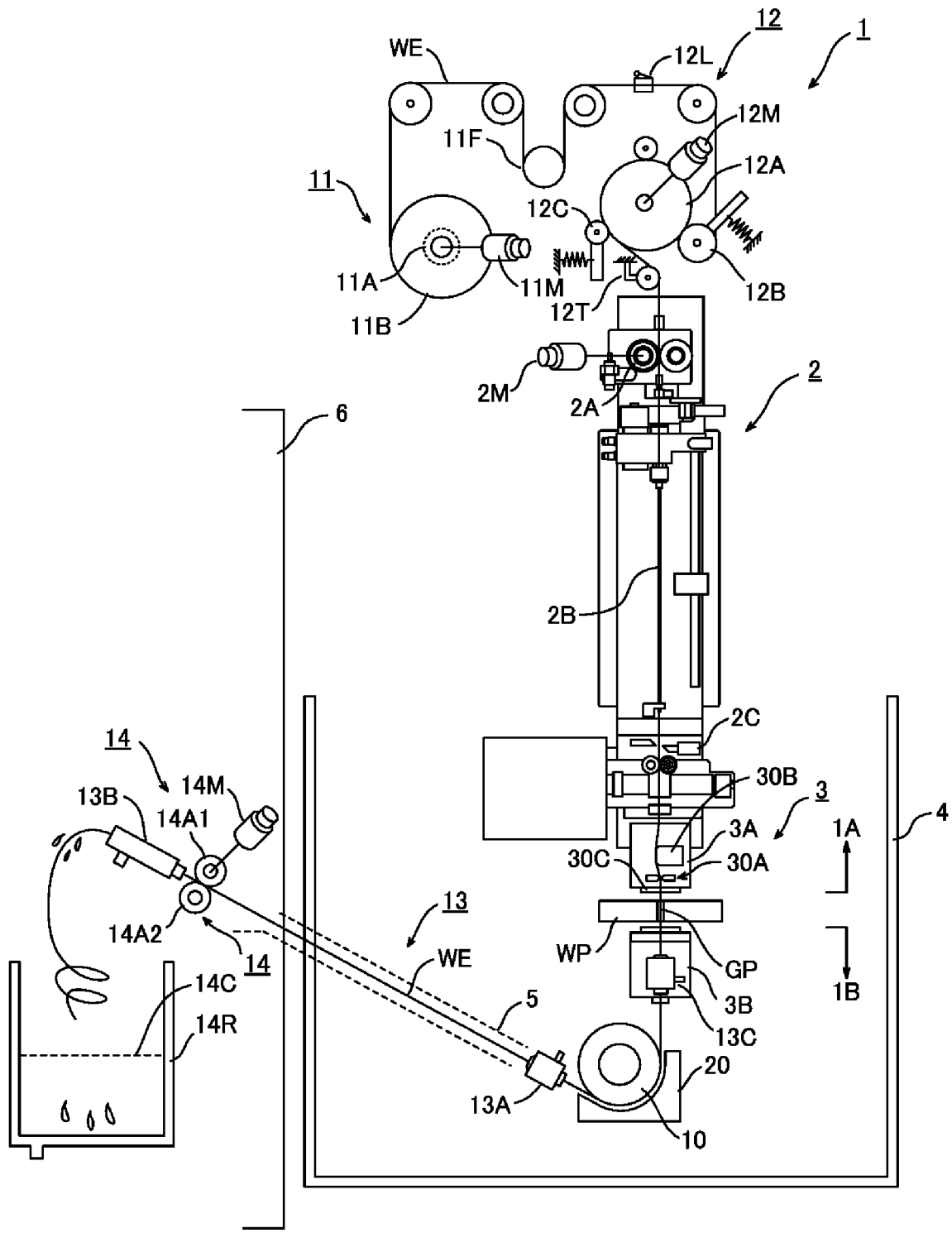
FIG. 1 is a drawing schematically showing an entire configuration of a wire electric discharge machining apparatus of the present disclosure.

FIG. 1 shows an entire general picture of a wire electric discharge machining apparatus of the present disclosure. In order to show an entire running route of a wire electrode WE in one side, FIG. 1 shows a supply-side of the wire electrode WE in a state viewed from the front of a machine body, and shows a collecting-side of the wire electrode WE in a state viewed from a left side surface of the machine body. Besides, in FIG. 1, in order to easily clarify multiple configuration components, it is necessary to notice that a relative size and a positional relationship of multiple configuration components are different from the actual product.

First, an entire configuration of the wire electric discharge machining apparatus of the embodiment shown in FIG. 1 is described. The wire electric discharge machining apparatus of the embodiment at least has: a running device 1; an automatic wire connection device 2; a wire guide unit 3; and a control device, a power-supply device, and a relative movement device not shown in drawings. A part where the running device 1, the automatic wire connection device 2, the wire guide unit 3 and the relative movement device are provided is called the machine body.

The running device 1 supplies an unused wire electrode WE to a processing gap GP which is formed between the wire electrode WE and a workpiece WP, and collects a used wire electrode WE supplied for process. The running device 1 includes a supply device 11, a tensile force device 12, a conveying device 13, and a collecting device 14. The part from the supply device 11 through the tensile force device 12 and the automatic wire connection device 2 to an upper-side wire guide assembly 3A is set as the supply-side 1A of the wire electrode WE, and the part from a lower-side wire guide assembly 3B through the conveying device 13 to the collecting device 14 is set as the collecting side 1B of the wire electrode WE.

The automatic wire connection device 2 stretches the wire electrode WE automatically. The automatic wire connection device 2 of the wire electric discharge machining apparatus of the embodiment includes a delivery roller 2A, a guide pipe 2B and a cutter 2C. The delivery roller 2A is rotated by a delivery motor 2M and sends out the wire electrode WE. The guide pipe 2B guides a tip of the wire electrode WE to the upper-side wire guide assembly 3A. The cutter 2C cuts the wire electrode WE. For example, the cutter 2C may be replaced with another device which cuts the wire electrode WE such as a heating roller which melts the wire electrode.

The wire guide unit 3 includes the upper-side wire guide assembly 3A and the lower-side wire guide assembly 3B. The upper-side wire guide assembly 3A is an assembly which integrally includes: a wire guide body 30A, which positions and guides the wire electrode WE; an electrified body 30B, which supplies an electric power to the wire electrode WE; and a processing fluid jet nozzle 30C, which supplies processing fluid jet to the processing gap GP. Similarly, the lower-side wire guide assembly 3B is also an assembly which integrally includes: a wire guide body, an electrified body, and a process fluid jet nozzle, which are not shown in the drawings.

The control device omitted in drawings controls an operation of the wire electric discharge machining apparatus. The control device is connected to the running device 1, the automatic wire connection device 2, the process power-supply device, or the relative movement device respectively with more than one signal wire, and a prescribed sequence operation is conducted. The control device includes a numerical control device which causes the running device 1, the automatic wire connection device 2, the process power-supply device, and the relative movement device to conduct a prescribed operation by an NC program, and optionally controls the operation of the entire wire electric discharge machining apparatus to carry out a desired process.

The process power-supply device continuously supplies an electrical discharge current pulse which has a desired waveform and peak current value to the processing gap GP. The relative movement device relatively moves the wire electrode WE and the workpiece WP in horizontal biaxial directions. The relative movement device includes a tapered device which inclines relative to the wire electrode WE and the workpiece WP.

A processing tank 4 accommodates the workpiece WP and the processing fluid. When the process is carried out in a "flushing method" by which the processing fluid jet is injected and supplied to the processing gap GP in a state that the workpiece WP is exposed to the air, a tank wall prevents the processing fluid from scattering. When the process is carried out in a "submerged method" by which the workpiece WP is submerged in the processing fluid, the tank wall prevents the processing fluid from leaking.

A lower arm 5 supports the lower-side wire guide assembly 3B. One end of the lower arm 5 on the upstream side of the running route of the wire electrode WE is set as a front end, the other end of the lower arm 5 on the downstream side of the running route of the wire electrode WE is set as a back end. In the wire electric discharge machining apparatus of the embodiment, the lower arm 5 is provided to incline on a front side of the machine body and cross the tank wall of the processing tank 4, so that the front end of the lower arm 5 can be arranged inside the processing tank 4. The lower arm 5 may be provided horizontally penetrating the tank wall of the processing tank 4. However, the lower aria 5 being provided to incline cross the tank wall is advantageous in that there is no need to provide a seal between the tank wall of the processing tank 4 and the lower arm 5.

The back end of the lower arm 5 is fixed to a mechanical structure on the outer side of the processing tank 4. Specifically, in the wire electric discharge machining apparatus of the embodiment, the lower arm 5 is fixed to a column 6 together with a collecting unit which attaches a winding roller 14A of the collecting device 14. The front end of the lower arm 5 is provided to position on an inner side of the processing tank 4. The lower arm 5 supports the lower-side wire guide assembly 3B and a direction changing pulley 10 at the front end.

The direction changing pulley 10 is rotatably attached directly below the lower-side wire guide assembly 3B which is in a guide block 20 provided to be fixed on the front end of the lower arm 5. The direction changing pulley 10 deflects a traveling direction of the wire electrode WE from a direction perpendicular to a setting surface of the work pieces WP to a direction of the winding roller 14A.

Next, the running device 1 of the embodiment is described more specifically. The supply device 11 of the running device 1 supplies the wire electrode WE to the processing gap GP. The supply device 11 includes a reel 11A, a wire bobbin 11B, a servo pulley 11F and a brake 11M. The wire bobbin 11B is a replaceable consumable item which winds the wire electrode WE with a prescribed length around a shaft centre to store the wire electrode WE. The wire bobbin 11B is loaded to the reel 11A and rotates.

The reel 11A rotates in accordance with a speed at which the tensile force device 12 continuously draws out the wire electrode WE from the wire bobbin 11B. The brake 11M is, for example, a torque motor or a powder clutch. The brake 11M is provided to be directly connected to a rotary shaft of the reel 11A, and prevents an idling of the wire bobbin 11B by applying a load in a range where the reel 11A is rotatable in a direction opposite to a rotation direction of the reel 11A. The servo pulley 11F moves up and down, in accordance with a fluctuation of a tensile force of the wire electrode WE, by its own weight, and absorbs a vibration of the running wire electrode WE supplied from the wire bobbin 11B.

The tensile force device 12 pulls out the wire electrode WE from the wire bobbin 11B, and sequentially sends out the wire electrode WE to the processing gap GP. In addition, the tensile force device 12 gives the prescribed tensile force to the wire electrode WE supplied to the processing gap GP between the tensile force device 12 and the collecting device 14. The tensile force device 12 includes a driving roller 12A, a driven roller 12B, a pinch roller 12C and a servomotor 12M. A strain gauge 12T is a tensile force detector. A limit switch 12L is a disconnection detector.

The driving roller 12A serves both as a delivery roller which sends out the wire electrode WE to the processing gap GP by drawing out the wire electrode WE from the wire bobbin 11B and as a tension roller which gives the prescribed tensile force to the wire electrode WE. The wire electrode WE is wound by the driven roller 12B and the pinch roller 12C so as to detour an outer circumference of the driving roller 12A. The driving roller 12A is rotated by the servomotor 12M. The control device controls a rotation speed of the servomotor 12M and maintains a fixed tensile force based on the tensile force detected by the strain gauge 12T.

The conveying device 13 guides the used wire electrode WE, which is deflected to the direction of the winding roller 14A by the direction changing pulley 10, out to the outer side of the processing tank 4. The conveying device 13 includes a high-pressure jet flow generator 13A and a suction pipe 13B. The high-pressure jet flow generator 13A is provided between the direction changing pulley 10 and the winding roller 14A on a front end side of the lower arm 5. The suction pipe 13B is provided on an exit side of the winding roller 14A. On the running route of the wire electrode WE between the high-pressure jet flow generator 13A and the suction pipe 13B, that is on a conveying route, there is nothing that becomes an obstacle to the wire electrode WE flying in the air.

The high-pressure jet flow generator 13A spouts and supplies the high-pressure jet flow toward a direction of the suction pipe 13B cross the winding roller 14A. Basically, liquid of the high-pressure jet flow is not limited in types and may be water. Desirably, in order that the high-pressure jet flow does not directly affect the process due to the mixture with the processing fluid, the liquid of the high-pressure jet flow is the processing fluid used in the process. A liquid column JA formed by the high-pressure jet flow is continuous so that a bridge seems to be build up between an opening of the high-pressure jet flow generator 13A and the suction pipe 13B.

The high-pressure jet flow generator 13A guides wire electrode WE only by the restraining force of the high-pressure jet flow in a state that the liquid column JA of the high-pressure jet flow is continuous between the high-pressure jet flow generator 13A and the suction pipe 13B, and the wire electrode WE flies to the direction toward the winding roller 14A with the high-pressure jet flow. The suction pipe 13B sucks and captures the tip the wire electrode WE sent by the high-pressure jet flow.

In the embodiment, specifically the high-pressure jet flow generator 13A is a jet nozzle. The high-pressure jet flow generator 13A may be another device which can spout and supply the high-pressure jet flow in a state that the wire electrode WE is restrained in the liquid column JA, and may be replaced with the jet nozzle. In addition, in the embodiment, specifically the suction pipe 13B is an aspirator. The suction pipe 13B may be another device which can suck the liquid of the high-pressure jet flow and the wire electrode WE together from the front and spit out the liquid of the high-pressure jet flow and the wire electrode WE to the back, and may be replaced with the aspirator. Furthermore, when the suction pipe 13B is the aspirator, a suction force for sucking the wire electrode WE is generated by supplying liquid with a prescribed pressure from a supply port on a side surface of the aspirator. Preferably, the liquid supplied to the aspirator is the processing fluid.

The wire electric discharge machining apparatus of the embodiment includes a high-pressure jet flow generator 13C between the lower-side wire guide assembly 3B and the direction changing pulley 10. Particularly, in the wire electric discharge machining apparatus shown in FIG. 1, the high-pressure jet flow generator 13C leads the wire electrode WE passing through the lower-side wire guide assembly 3B to a groove shaped route between the direction changing pulley 10 and the guide block 20, and helps the wire electrode WE proceeds from the direction changing pulley 10 toward the direction of the high-pressure jet flow generator 13A. In the embodiment, specifically the high-pressure jet flow generator 13C is a jet nozzle. The high-pressure jet flow generator 13C may be another device which can lead the wire electrode WE to the groove shaped route between the direction changing pulley 10 and the guide block 20 by the high-pressure jet flow, and may be replaced with the jet nozzle.

The collecting device 14 collects the used wire electrode WE. In addition, the collecting device 14 makes the wire electrode WE run at a fixed speed. The collecting device 14 collects the used wire electrode WE by separating the used wire electrode WE from the liquid of the high-pressure jet flow. The collecting device 14 includes the winding roller 14A, a winding motor 14M and a bucket 14R.

The winding roller 14A includes a pair of rollers which is a driving roller 14A1 rotated by the winding motor 14M, and a driven roller 14A2 rotated by the driving roller 14A1. The winding roller 14A makes the wire electrode WE run at the fixed running speed by sandwiching the wire electrode WE between the pair of rollers. The pair of rollers of the winding roller 14A can move in directions separating from one another, release the wire electrode WE from restraint, and open the running route of the wire electrode WE.

The winding motor 14M which rotates the driving roller 14A1 maintains a prescribed rotation speed faster than the rotation speed of the servomotor 12M of the tensile force device 12. A speed difference is generated between the driving roller 12A of the tensile force device 12 and the winding roller 14A, by which the wire electrode WE runs at the prescribed running speed, and the tensile force, of which the magnitude is corresponding to the speed difference of the driving roller 12A and the winding roller 14A, is given to the wire electrode WE.

The bucket 14R of the collecting device 14 is a collecting box which collects the wire electrode WE. In the bucket 14R, for example, a draining board 14C such as a wire mesh is provided, so that the liquid of the high-pressure jet flow, which is discharged from the suction pipe 13B together with the wire electrode WE, can be separated from the wire electrode WE and collected. When the wire electrode WE is cut in to pieces before collecting, the draining board 14C is changed to a filter with small meshes.

Figure 2:
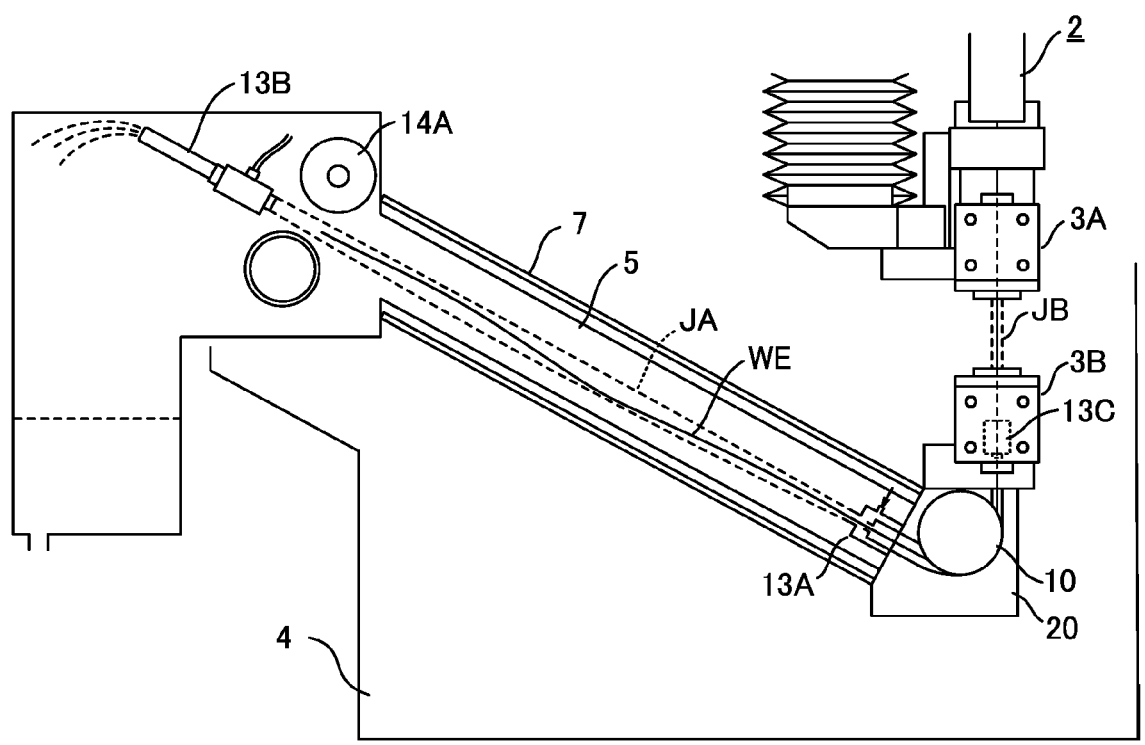
FIG. 2 is a drawing schematically showing a conveying device of a wire electric discharge machining apparatus of the present disclosure.

Next, an operation at the time of the automatic wire connection of the wire electric discharge machining apparatus of the embodiment is specifically described using FIG. 2 while referring to FIG. 1 appropriately. FIG. 2 shows the conveying device 13 of the wire electric discharge machining apparatus shown in FIG. 1. A right side of FIG. 2 is the front side of the machine body. FIG. 1 shows a state immediately after the wire electrode WE is connected. FIG. 2 shows a state on the way that the wire electrode WE flies in the liquid column JA of the high-pressure jet flow forming between the high-pressure jet flow generator 13A and the suction pipe 13B toward the suction pipe 13B.

Immediately before the automatic wire connection starts, the tip of the wire electrode WE is positioned more closely to the processing gap GP side than at least the delivery roller 2A of the automatic wire connection device 2 shown in FIG. 1. In addition, the pair of rollers of the winding roller 14A of the collecting device 14 is opened, and is in a state when there is no obstacle on the running route of the wire electrode WE between the high-pressure jet flow generator 13A and the suction pipe 13B.

The control device supplies the high-pressure water flow into the guide pipe 2B of the automatic wire connection device 2 in a state that the guide pipe 2B is arranged in a position with a prescribed height until the automatic wire connection starts, and actuates the high-pressure jet flow generator 13A, the suction pipe 13B, and the high-pressure jet flow generator 13C of the conveying device 13. If the high-pressure jet flow generator 13A and the suction pipe 13B are actuated, the high-pressure jet flow spout from the high-pressure jet flow generator 13A and aiming at the suction pipe 13B is sucked by the suction pipe 13B, and the liquid column JA is formed so as to build up a bridge between the high-pressure jet flow generator 13A and the suction pipe 13B.

If the automatic wire connection starts, the control device makes the delivery roller 2A of the automatic wire connection device 2 be rotated at the prescribed rotation speed. If the tip of the wire electrode WE is inserted into the guide pipe 2B, the control device lowers the guide pipe 2B at a speed the same as the moving speed of the wire electrode WE. The guide pipe 2B is filled with the high-pressure water flow, so that the wire electrode WE, of which the front end is downward, is guided by the guide pipe 2B without being caught in the inner wall of the guide pipe 2B, and reaches the upper-side wire guide assembly 3A.

The control device supplies the processing fluid jet from the upper-side wire guide assembly 3A, and a liquid column JB formed by the processing fluid jet is formed between the upper-side wire guide assembly 3A and the lower-side wire guide assembly 3B. The tip of the wire electrode WE which moves downward because of the delivery roller 2A is restrained in the liquid column JB and reaches the lower-side wire guide assembly 3B.

The wire electrode WE which passes through the lower-side wire guide assembly 3B reaches the groove shaped running route formed between the direction changing pulley 10 and the guide block 20 without departing from the running route formed in the guide block 20 by the high-pressure jet flow spout and supplied from the high-pressure jet flow generator 13C. The direction changing pulley 10 which is an idling roller cooperates with the high-pressure jet flow of the high-pressure jet flow generator 13C and guides the wire electrode WE to the high-pressure jet flow generator 13A.

When the tip of the wire electrode WE reaches the high-pressure jet flow generator 13A, the control device increases the rotation speed of the delivery motor 2M and makes the delivery roller 2A rotate at a high speed. The wire electrode WE reaches the suction pipe 13B without stopping with the liquid column JA of the high-pressure jet flow formed between the high-pressure jet flow generator 13A and the suction pipe 13B by the high-pressure jet flow generator 13A. In this state, the suction pipe 13B which captures the tip of the wire electrode WE sucks the wire electrode WE and sends out the wire electrode WE to a direction of the bucket 14R.

When the tip of the wire electrode WE is detected to reach the bucket 14R by a sensor not shown in drawings, the control device stops the high-pressure jet flow generator 13A and the high-pressure jet flow generator 13C, and closes the pair of open rollers of the winding roller 14A to clamp the wire electrode WE. Furthermore, after the connection is finished, although the high-pressure jet flow generator 13A is stopped, the suction pipe 13B may be stopped, or continues to operate as it is when a diameter of the wire electrode WE is small.

The wire electric discharge machining apparatus of the embodiment is provided, at least inside the processing tank 4 between the high-pressure jet flow generator 13A and the suction pipe 13B, with a cover 7 to seal and cover the high-pressure jet flow spout and supplied from the high-pressure jet flow generator 13A and the wire electrode WE sent by the high-pressure jet flow, so that the high-pressure jet flow and the wire electrode WE do not contact with the processing fluid stored in the processing tank 4. In the wire electric discharge machining apparatus of the embodiment shown in FIG. 2, one end of the cover 7 is closely fixed to the guide block 20 to avoid infiltration of the processing fluid, and the other end is fixed to a wall surface of the column 6 shown in FIG. 1 on the outer side of the processing tank 4. Alternatively, the cover 7 may be fixed to a side surface of the lower arm 5, for example.

The cover 7 makes it possible that the wire electrode WE is connected by flying with the high-pressure jet flow without stopping, even if the running route of the wire electrode WE is in the processing fluid between the high-pressure jet flow generator 13A and the suction pipe 13B. According to the wire electric discharge machining apparatus of the embodiment including the cover 7, it is not necessary to discharge the processing fluid from the processing tank 4 every time when the automatic wire connection is carried out, so that the time required for the entire operation of the automatic wire connection can be shortened.

Even when the work pieces WP are processed without being submerged in the processing fluid, the cover 7 may be provided to prevent the high-pressure jet flow from scattering. On this occasion, there is no processing fluid on the outer side of the cover 7, so that it is not necessary to be liquid-tight by sealing the cover 7.

It is not necessary for the present disclosure to be the same as the configuration of the wire electric discharge machining apparatus of the embodiment described above; although several examples has been shown already, the present disclosure may be deformed, or replaced in components, or combined with another disclosure in a range not departing from the technical concept of the present disclosure.

What is claimed is:

1. A wire electric discharge machining apparatus, comprising:
    a processing tank, which accommodates a workpiece;
    a lower-side wire guide assembly including a wire guide body, which positions and guides a wire electrode;
    a lower arm, which is provided so that a front end of the lower arm is positioned on an inner side of the processing tank, and the lower arm supports the lower-side wire guide assembly at the front end;
    a direction changing pulley, which is provided directly below the lower-side wire guide assembly;
    a winding roller, which is provided on an outer side of the processing tank; and
    a conveying device, which sends out the wire electrode to the winding roller;
    wherein the conveying device comprises:
        a high-pressure jet flow generator, which is provided on a side of the front end of the lower arm between the direction changing pulley and the winding roller in a plain view, and spouts a high-pressure jet flow toward a direction of the winding roller so that the wire electrode is guided only by a restraining force of the high-pressure jet flow without going through a guide pipe guiding the wire electrode and sent flying to the direction of the winding roller with the high-pressure jet flow; and
        a suction pipe, which is provided on an exit side of the winding roller, and sucks and captures a tip of the wire electrode sent by the high-pressure jet flow,
    wherein the direction changing pulley, the high-pressure jet flow generator, the winding roller, and the suction pipe are arranged on a conveying route of the wire electrode in order from a side of the lower arm.

2. The wire electric discharge machining apparatus according to claim 1, wherein
    the high-pressure jet flow generator is a jet nozzle.

3. The wire electric discharge machining apparatus according to claim 1, wherein
    the suction pipe is an aspirator.

4. The wire electric discharge machining apparatus according to claim 1, wherein
    the lower arm is fixed to a mechanical structure.

5. The wire electric discharge machining apparatus according to claim 4, wherein
    a back end of the lower arm is fixed to a column.

6. The wire electric discharge machining apparatus according to claim 1, wherein
    the lower arm is arranged inclined cross a tank wall of the processing tank.

7. The wire electric discharge machining apparatus according to claim 1, further comprising:
    a cover, which covers the high-pressure jet flow and the wire electrode sent by the high-pressure jet flow, inside at least the processing tank between the high-pressure jet flow generator and the suction pipe.

* * * * *